United States Patent
Fan et al.

(10) Patent No.: US 11,245,543 B2
(45) Date of Patent: Feb. 8, 2022

(54) IDENTIFYING ABNORMAL USAGE OF ELECTRONIC DEVICE

(71) Applicant: Microsoft Technology Licensing, LLC, Redmond, WA (US)

(72) Inventors: Zhiwei Fan, Redmond, WA (US); Albert Thambiratnam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/051,719

(22) PCT Filed: Jun. 15, 2018

(86) PCT No.: PCT/CN2018/091500
§ 371 (c)(1),
(2) Date: Oct. 29, 2020

(87) PCT Pub. No.: WO2019/237332
PCT Pub. Date: Dec. 19, 2019

(65) Prior Publication Data
US 2021/0126809 A1    Apr. 29, 2021

(51) Int. Cl.
*H04L 12/28*     (2006.01)
*H04L 12/26*     (2006.01)
*H04L 29/08*     (2006.01)

(52) U.S. Cl.
CPC ...... *H04L 12/2823* (2013.01); *H04L 43/0876* (2013.01); *H04L 43/16* (2013.01); *H04L 67/22* (2013.01)

(58) Field of Classification Search
CPC . H04L 12/2823; H04L 43/0876; H04L 43/16; H04L 67/22
See application file for complete search history.

(56) References Cited

U.S. PATENT DOCUMENTS

| 2003/0149570 | A1 | 8/2003 | Qiu |
| 2014/0018107 | A1* | 1/2014 | Bull ................ G06Q 30/02 455/456.3 |

(Continued)

FOREIGN PATENT DOCUMENTS

| CN | 104424391 A | 3/2015 |
| CN | 105049421 A | 11/2015 |

(Continued)

OTHER PUBLICATIONS

"International Search Report and Written Opinion issued in PCT Application No. PCT/CN18/091500", dated Mar. 13, 2019, 10 Pages.

(Continued)

*Primary Examiner* — Christopher B Robinson
(74) *Attorney, Agent, or Firm* — Schwegman Lundberg & Woessner, P.A.

(57) ABSTRACT

A method and an apparatus for identifying an abnormal usage of an electronic device are provided. A usage behavior of the electronic device may be monitored. Usage information associated with the usage behavior may be obtained. The usage information may be provided to a personal usage model established for a user of the electronic device. An abnormal usage of the electronic device may be determined based at least on the usage information through the personal usage model. A notification of the abnormal usage may be generated.

13 Claims, 9 Drawing Sheets

(56) References Cited

U.S. PATENT DOCUMENTS

| | | | | |
|---|---|---|---|---|
| 2016/0103996 A1* | 4/2016 | Salajegheh | ........... | H04L 63/145 |
| | | | | 726/25 |
| 2016/0146866 A1* | 5/2016 | Houlette | .............. | G01R 21/133 |
| | | | | 702/62 |
| 2016/0150298 A1* | 5/2016 | Kim | ........................ | H04L 67/12 |
| | | | | 340/870.02 |
| 2017/0024660 A1* | 1/2017 | Chen | ....................... | G06N 5/045 |
| 2019/0122132 A1* | 4/2019 | Rimini | ................... | G06N 7/005 |

FOREIGN PATENT DOCUMENTS

| | | | |
|---|---|---|---|
| CN | 106561026 A | | 4/2017 |
| CN | 106796627 A | | 5/2017 |
| CN | 107465652 A | | 12/2017 |
| CN | 107710687 A | | 2/2018 |
| GB | 2528142 A | | 1/2016 |
| JP | 2019096179 A | * | 6/2019 |
| KR | 101767454 B1 | * | 8/2017 |
| WO | 2017183029 A1 | | 10/2017 |

OTHER PUBLICATIONS

"Office Action and Search Report Issued in China Patent Application No. 201880058671.X", (w/ Concise Statement of Relevance), dated Sep. 3, 2021, 15 Pages.

"Extended Search Report Issued in European Patent Application No. 18922374.6" dated Dec. 7, 2021, 9 Pages.

* cited by examiner

400

402 — <time point=7:00 am>, <physical button click>, <time duration=3 s>, <valid>, <power off>

404 — <time point=7:01 am>, <touch screen click>, <time duration=0.5 s>, <strength = level 1>, <application = "Wechat">, <valid>, <power on>

406 — <time period= 7:01 am to 7:10 am>, <touch screen click>, <number of touch screen click= 26>, <time duration=0.5 s>, <strength = level 1>, <power on>

408 — <time period= 7:01 am to 7:05 am>, <touch screen swipe>, <number of touch screen swipe= 12>, <time duration=0.3 s>, <strength = level 1>, <application = "Wechat">, <power on>

410 — <time period= 7:10 am to 7:30 am>, <no interactive action>, <time duration=20 min 5 s>, <movement speed = 2.2~2.5 m/s>, <jogging, 7:10 am to 7:30 am everyday>, <power on>

IDENTIFYING ABNORMAL USAGE OF ELECTRONIC DEVICE

CROSS-REFERENCE TO RELATED APPLICATION

This application is a U.S. National Stage Filing under 35 U.S.C. 371 of International Patent Application Serial No. PCT/CN2018/091500, filed Jun. 15, 2018, and published as WO 2019/237332 A1 on Dec. 19, 2019; which application and publication are incorporated herein by reference in their entirety.

BACKGROUND

Various electronic devices are widely used in people's daily life. For example, smartphones are used by people to communicate with each other, to run applications or software associated with livings, to have entertainment, etc. Household appliances are also used by people to facilitate their livings, such as, entertaining through TV sets, cooking by microwave ovens, etc.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for identifying an abnormal usage of an electronic device. A usage behavior of the electronic device may be monitored. Usage information associated with the usage behavior may be obtained. The usage information may be provided to a personal usage model established for a user of the electronic device. An abnormal usage of the electronic device may be determined based at least on the usage information through the personal usage model. A notification of the abnormal usage may be generated.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

FIG. 4 illustrates an exemplary feature set of a personal usage model according to an embodiment.

DETAILED DESCRIPTION

Figure 1A:
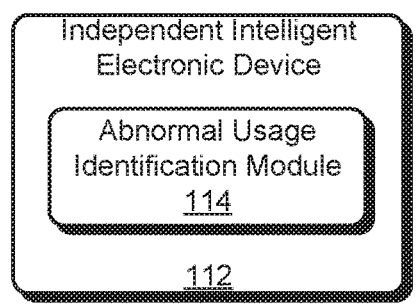
FIG. 1A-FIG. 1C illustrate exemplary application scenarios of abnormal usage identification according to some embodiments.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

In some circumstances, electronic devices may be used in an abnormal way. For example, a smartphone is a high-frequency usage device for most people. If a smartphone is not used by a user for all day long, an abnormal usage of the smartphone may have occurred. For example, a user will open a refrigerator door for merely several seconds to take foods out or put foods in. If the refrigerator door keeps opened for 20 minutes, this may be an abnormal usage of the refrigerator.

Usually, an abnormal usage of an electronic device may indicate an abnormal state of the user of the electronic device. For example, if a smartphone is keeping powered off all day long in a certain day, this may indicate that the user of the smartphone may lose an ability of using the smartphone, e.g., the user is seriously ill, loses the smartphone, etc. For example, if all household appliances in a house have not been used for over 48 hours, this may indicate that the people lived in the house may lose an ability to act, such as, being seriously ill, having died, etc.

According to those existing approaches for determining an abnormal usage of an electronic device, a current usage state of the electronic device may be detected and compared with a predetermined threshold. If the current usage state exceeds or is below the predetermined threshold, an abnormal usage may be determined. The predetermined threshold may be set based on an average measurement among most users or a general safety standard. The average measurement among most users refers to an average value among usage states detected for most users of the electronic device. For example, if most smartphone users operate their smartphones for at least 10 minutes every day, a threshold of "10 minutes" may be set for minimum total usage time in a day. If it is detected that a certain smartphone is only used for 2 minutes in a certain day which is below the threshold, it can be determined that an abnormal usage of the smartphone occurs. The general safety standard refers to a prescriptive or advisory usage parameter for ensuring safe usage or effective functions of the electronic device, which is provided by a producer of the electronic device or is well known in the industry. For example, a threshold of "12 hours" may be set for maximum time duration of keeping a TV set turned on, a threshold of "20 seconds" may be set for maximum time duration of keeping a refrigerator door opened, etc. Thus, for example, if it is detected that a refrigerator door has been in an open state for 20 minutes which exceeds the threshold of "20 seconds", this may be an abnormal usage of the refrigerator.

Embodiments of the present disclosure propose to consider a user's personal usage habits, rather than average measurements among most users or general safety standards, when identifying an abnormal usage of an electronic device. Hereinafter, a user of an electronic device may refer to an owner of the electronic device, a long-time user of the electronic device, etc., and the user may be a single person or a group of persons. Through comparing a current usage state of the electronic device with the user's personal usage habits, the embodiments of the present disclosure may efficiently and accurately identify whether an abnormal usage of the electronic device occurs. Accordingly, the embodiments of the present disclosure may determine whether the user is in an abnormal state, e.g., whether the user is in a bad physical condition, etc., or determine whether the electronic device is currently used by others illegally.

In some aspects, in order to represent a user's personal usage habits of an electronic device, a personal usage model which is specific for the user may be established. The personal usage model may be a learning-based model, and may be established based on various techniques, e.g., logistic regression, Recurrent Neural Network (RNN), etc. The personal usage model may be used for determining an abnormal usage of the electronic device based at least on detected usage states of the electronic device.

According to the embodiments of the present disclosure, if an abnormal usage of the electronic device is identified, a notification of the abnormal usage may be further generated and sent to a third party. Herein, the third party refers to at least one person or organization that is associated with the user. For example, if the user is an old man, the third party may be the old man's children, a charity organization taking care of the old man, etc. If the user is a child, the third party may be the child's parents, the child's teacher, etc. Thus, when identifying an abnormal usage of the electronic device and accordingly determining, e.g., an abnormal physical condition of the user, the third party may receive the notification and offer timely help to the user.

In some aspects, during establishing the personal usage model and detecting usage states of the electronic device, the embodiments of the present invention may avoid using privacy information. Thus, the embodiments may identify an abnormal usage of the electronic device without an collection and invasion of privacy.

Figure 1B:
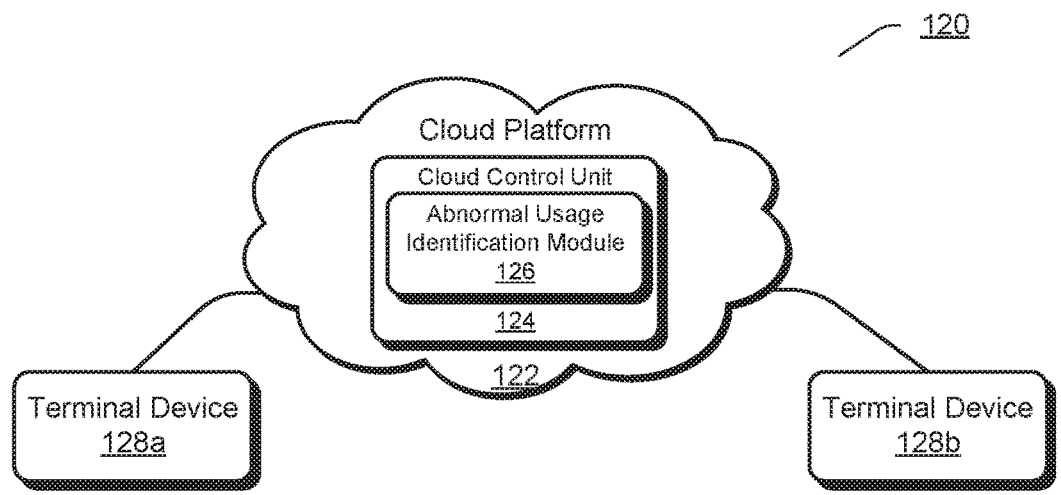
Figure 1C:
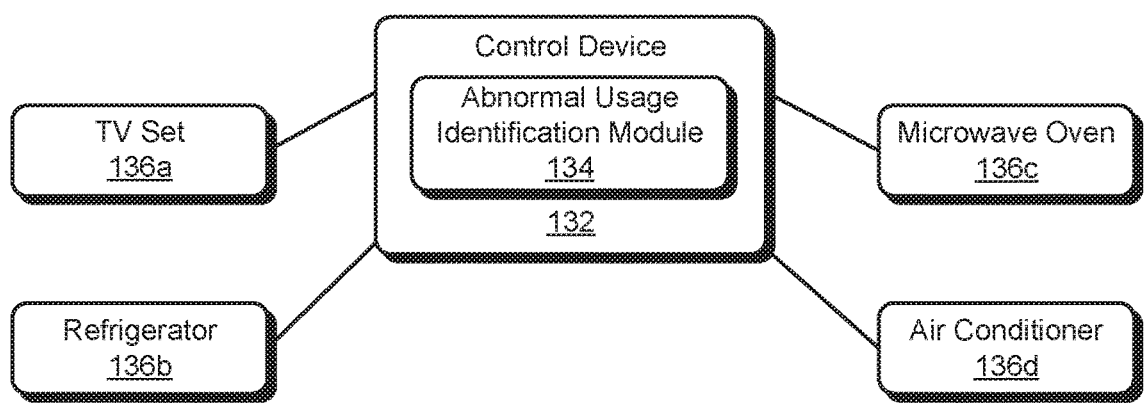

FIG. 1A-FIG. 1C illustrate exemplary application scenarios of abnormal usage identification according to some embodiments. The exemplary application scenarios in FIG. 1A-FIG. 1C show that abnormal usages may be identified for different types of electronic device.

In scenario 110 shown in FIG. 1A, an electronic device to be identified abnormal usages may be an independent intelligent electronic device 112. The electronic device 112 has independent processing and communication capabilities. The electronic device 112 may detect its usage states through various hardware components, e.g., acceleration sensor, magnetic sensor, gyroscope, pressure sensor, touch sensor, timer, etc. The electronic device 112 may further detect its usage states through an operating system on the electronic device 112, wherein the operating system can obtain running information of various applications or functions, interaction information between a user and user interfaces of the electronic device 112, etc. The electronic device 112 may be movable or immovable. Examples of the electronic device 112 may be a smartphone, a laptop, a desktop computer, a wearable device, etc., wherein the wearable device may comprise smart watch, smart band, smart glasses, etc.

The independent intelligent electronic device 112 may comprise an abnormal usage identification module 114. The abnormal usage identification module 114 may be configured for identifying an abnormal usage of the electronic device 112. In an implementation, the abnormal usage identification module 114 may be a hardware component included in the electronic device 112. In an implementation, the abnormal usage identification module 114 may be an application or computer program preinstalled in the electronic device 112 or downloaded into the electronic device 112 in response to a request from the user. The abnormal usage identification module 114 may perform a monitoring process for monitoring usage states of the electronic device 112, through utilizing hardware components in the electronic device 112 for detecting usage states, or through interacting with the operating system to obtain the usage states. The abnormal usage identification module 114 may identify an abnormal usage of the electronic device 112 based at least on the monitored usage states. When identifying the abnormal usage of the electronic device 112, the abnormal usage identification module 114 may generate a notification of the abnormal usage, and send the notification to a third party through invoking a communication capability of the electronic device 112.

In scenario 120 shown in FIG. 1B, an electronic device to be identified abnormal usages may be a terminal device 128a or 128b in a cloud system. The cloud system may be based on various cloud technologies, and may provide various cloud services, e.g., computing, processing, storing or sharing of data, to terminal devices 128a and 128b by a cloud platform 122. The cloud platform 122 may be a distributed or centralized collection of computing resources, processing resources, storing resources, etc. The terminal devices 128a and 128b may connect to the cloud platform 122, exchange data with the cloud platform 122 and obtain various cloud services from the cloud platform 122. The terminal devices 128a and 128b may be intelligent electronic devices, or non-intelligent electronic devices, e.g., household appliances. Although only two terminal devices are shown in FIG. 1B, it should be appreciated that a different number of terminal devices may be included in the cloud system.

The cloud platform 122 may comprise at least one cloud control unit 124 which interacts with terminal devices and provides cloud services to the terminal devices. In an implementation, the cloud control unit 124 may collect usage states of a terminal device through detecting the usage states of the terminal device or through receiving a report about usage states from the terminal device.

The cloud control unit 124 may comprise an abnormal usage identification module 126. The abnormal usage identification module 126 may be configured for identifying an abnormal usage of the terminal device 128a or 128b. In an implementation, the abnormal usage identification module 126 may be a hardware component included in the cloud control unit 124. In an implementation, the abnormal usage identification module 126 may be an application or computer program preinstalled in the cloud control unit 124 or downloaded into the cloud control unit 124. The abnormal usage identification module 126 may perform a monitoring process for monitoring usage states of the terminal device 128*a* or 128*b*, through interacting with the cloud control unit 124 to obtain the usage states. When identifying an abnormal usage of the terminal device 128*a* or 128*b*, the abnormal usage identification module 126 may generate a notification of the abnormal usage, and send the notification to a third party through invoking a communication capability of the cloud control unit 124. Although the abnormal usage identification module 126 is shown as included in the cloud control unit 124, it should be appreciated that the abnormal usage identification module 126 may also be implemented in the cloud platform 122 independently from the cloud control unit 124.

In scenario 130 shown in FIG. 1C, an electronic device to be identified abnormal usages may be one or more household appliances in an intelligent housing system. The intelligent housing system may be established based on, e.g., a local area network (LAN) deployed in a house, and the intelligent housing system may utilize a centralized control device 132 to control, monitor or collect usage states of various household appliances in the house. The household appliances may comprise, e.g., a TV set 136*a*, a refrigerator 136*b*, a microwave oven 136*c*, an air conditioner 136*d*, and/or any other types of household appliance.

The control device 132 may comprise an abnormal usage identification module 134. The abnormal usage identification module 134 may be configured for identifying an abnormal usage of one or more household appliances 136*a*, 136*b*, 136*c* or 136*d*. In an implementation, the electronic device to be identified abnormal usages may be a single household appliance. Thus, an abnormal usage of this single household appliance may be used for determining a condition of the user. In an implementation, the electronic device to be identified abnormal usages may be all of or a part of household appliances in the intelligent housing system, such that sufficient usage states may be utilized for identifying an abnormal usage and further determining a condition of the user. It should be appreciated that, the "user" here is not limited to a single person, but may be two or more persons living in the house together, and thus an abnormal usage of the electronic device may indicate a condition of all the persons living in the house. The abnormal usage identification module 134 may be a hardware component included in the control device 132. In an implementation, the abnormal usage identification module 134 may be an application or computer program preinstalled in the control device 132 or downloaded into the control device 132 in response to a request from the user. The abnormal usage identification module 134 may perform a monitoring process for monitoring usage states of one or more household appliances 136*a*, 136*b*, 136*c* or 136*d*, through interacting with the control device 132 to obtain the usage states. When identifying an abnormal usage of the one or more household appliances 136*a*, 136*b*, 136*c* or 136*d*, the abnormal usage identification module 134 may generate a notification of the abnormal usage, and send the notification to a third party through invoking a communication capability of the control device 132. Although the abnormal usage identification module 134 is shown as included in the control device 132, it should be appreciated that the abnormal usage identification module 134 may also be implemented in the intelligent housing system independently from the control device 132.

It should be appreciated that the application scenarios in FIG. 1A-FIG. 1C are merely exemplary, and the embodiments of the present disclosure are not limited to be implemented only in these scenarios.

As discussed above, a personal usage model may be established for a user of an electronic device, and may be used for determining an abnormal usage of the electronic device. For example, this model may be adopted in the abnormal usage identification module 114, 126 or 134 in FIG. 1A-FIG. 1C for performing abnormal usage identification.

Figure 2:
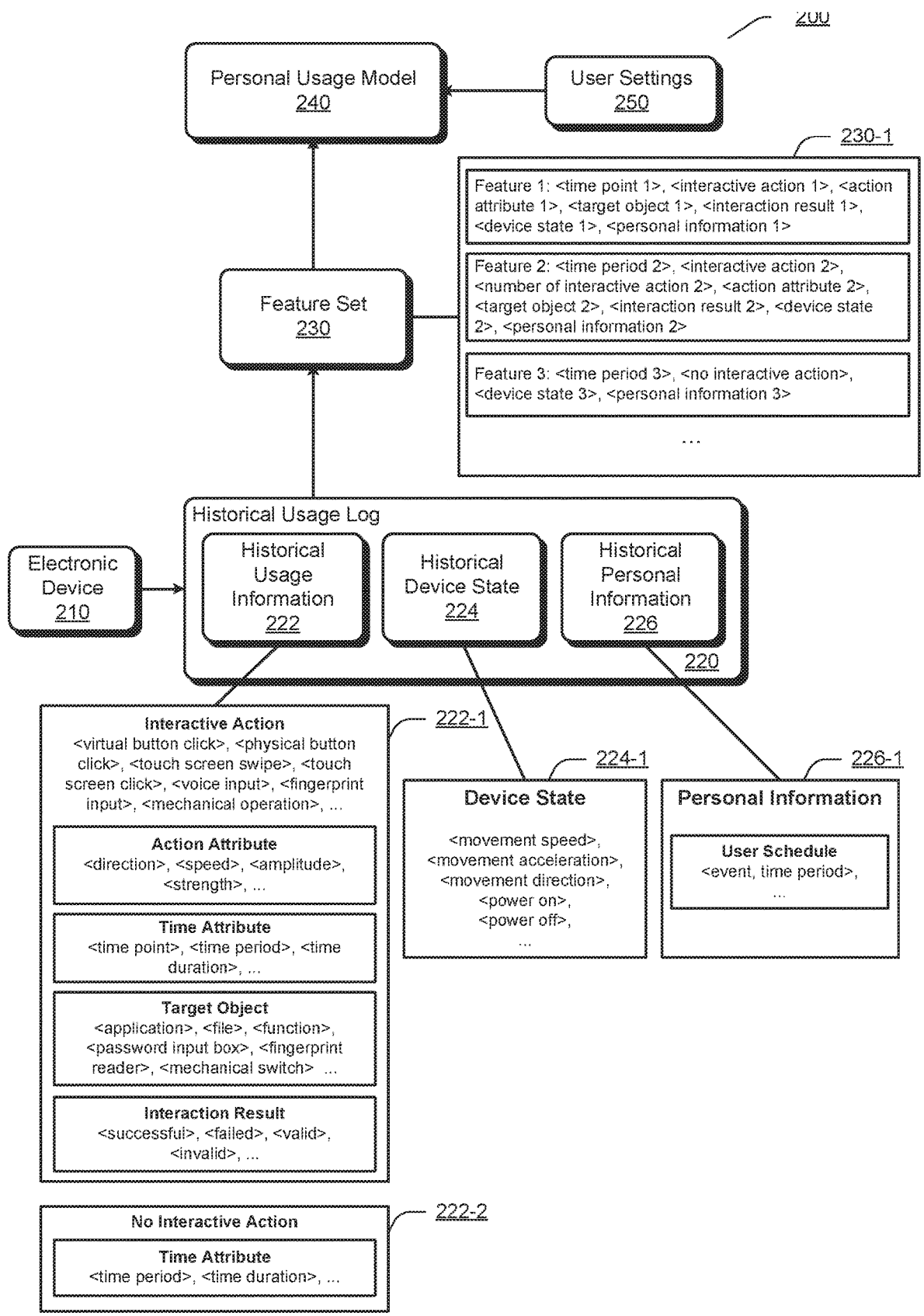
FIG. 2 illustrates an exemplary process for training a personal usage model according to an embodiment.

FIG. 2 illustrates an exemplary process 200 for training a personal usage model according to an embodiment. The personal usage model may be a learning-based model, such as, a logistic regression model, a RNN model, etc. The personal usage model is designed for determining an abnormal usage of an electronic device based at least on detected usage states of the electronic device. Accordingly, training data for the personal usage model may be obtained from historical usage states of the electronic device.

In FIG. 2, a personal usage model is to be established for a user of an electronic device 210. Historical usage log 220 of the electronic device 210 may be obtained, which includes various historical usage states of the electronic device 210. The historical usage log 220 may be obtained from the electronic device 210, a cloud control unit in a cloud system to which the electronic device 210 connects, a control device in an intelligent housing system to which the electronic device 210 belongs, etc. The historical usage states in the historical usage log 220 may comprise at least one of historical usage information 222, historical device state 224 and historical personal information 226. Each of the historical usage information 222, the historical device state 224 and the historical personal information 226 comprises a list of records in time series. Each record corresponds to a time point or a time period, and a plurality of records may be listed with time. Moreover, the historical usage information 222, the historical device state 224 and the historical personal information 226 are also associated with each other in terms of time. For example, for a certain time point or a certain time period, two or more of a historical usage information record, a historical device state record and a historical personal information record may be recorded in the historical usage log 220 concurrently.

The historical usage information 222 comprises a list of usage information records associated with the user's historical usage behaviors. A usage behavior may be an interactive action occurred to the electronic device 210 at a time point or during a time period, or may be an absence of interactive action during a time period. The interactive action may refer to an action performed by the user to the electronic device 210, e.g., virtual button click, physical button click, touch screen swipe, touch screen click, voice input, fingerprint input, mechanical operation, etc. For example, assuming that the electronic device 210 is a smartphone, a click action on a touch screen of the smartphone by the user would be an interactive action. For example, assuming that the electronic device 210 is a refrigerator, an opening operation of a door of the refrigerator would be a mechanical operation, which is also an interactive action.

In the case that the usage behavior is an interactive action occurred at a time point or during a time period, usage information of this usage behavior may comprise at least one of action attribute, time attribute, target object and interaction result of the interactive action, as shown in block 222-1.

The action attribute refers to attributes of the interactive action itself, and may comprise, such as, at least one of direction, speed, amplitude, strength, etc. The "direction" refers to a direction of the interactive action when applied on the electronic device, e.g., from left to right, from right to left, etc. The "speed" indicates how fast the interactive action is applied, e.g., 0.2 m/s. The "amplitude" refers to a distance or depth when applying the interactive action, e.g., amplitude of a touch screen swipe action may be 3 cm. The "strength" indicates a pressure caused by the interactive action, which may be scaled by several predefined levels. It should be appreciated that the embodiments of the present disclosure are not limited to the above exemplary action attributes, and should cover any other types of action attribute.

The time attribute refers to time information associated with the interactive action. The time attribute may comprise, such as, at least one of: time point, time period, time duration, etc. The "time point" indicates at what time the interactive action occurs. The "time period" refers to both a starting time and an ending time of the interactive action. The "time duration" indicates how long the interactive action continues or lasts. It should be appreciated that the embodiments of the present disclosure are not limited to the above exemplary time attributes, and should cover any other types of time attribute.

The target object refers to an object on which the interactive action is applied. The target object may comprise, such as, at least one of: application, file, function, password input box, fingerprint reader, mechanical switch, etc. For example, assuming that the electronic device 210 is a smartphone, if the user clicks on an icon of the application "Wechat" on a touch screen of the smartphone so as to run this application, the application "Wechat" is a target object of this touch screen click action. For example, assuming that the electronic device 210 is a smart watch, if the user clicks on a virtual button "heart rate" on a touch screen of the smart watch so as to check the heart rate of the user, the function "heart rate" is a target object of this virtual button click action. For example, assuming that the electronic device 210 is a microwave oven, if the user turns a temperature knob of the microwave oven, the temperature knob, as a mechanical switch, is a target object of this mechanical operation. It should be appreciated that the embodiments of the present disclosure are not limited to the above exemplary target objects, and should cover any other types of target object.

The interaction result refers to a result caused by the interactive action. The interaction result may comprise, such as, at least one of: successful, failed, valid, invalid, etc. If the interactive action is an action to be verified, e.g., fingerprint input, an interaction result may indicate whether the verification is passed, e.g., successful or failed. If the interactive action is only an operational action without the need of verification, e.g., a swipe on a touch screen, an interaction result may indicate whether the action has been identified by the electronic device, e.g., valid or invalid. It should be appreciated that the embodiments of the present disclosure are not limited to the above exemplary interaction results, and should cover any other types of interaction result.

Moreover, it should be appreciated that the usage information shown in block 222-1 is exemplary, and the embodiments of the present disclosure are not limited to the exemplary usage information.

In the case that the usage behavior is an absence of interactive action during a time period, usage information of this usage behavior may comprise, such as, time attribute, as shown in block 222-2. The time attribute refers to time information associated with the usage behavior, i.e., time information associated with the absence of interaction action. The time attribute may comprise, such as, at least one of: time period, time duration, etc. The "time period" refers to both a starting time and an ending time of the absence of interactive action. The "time duration" indicates how long the absence of interactive action continues or lasts. It should be appreciated that the embodiments of the present disclosure are not limited to the above exemplary time attributes, and should cover any other types of time attribute.

It should be appreciated that the usage information shown in block 222-2 is exemplary, and the embodiments of the present disclosure are not limited to the exemplary usage information.

The historical device state 224 comprises a list of device state records in time series. Each device state record comprises various types of device state information at a certain time point or during a certain time period. As shown in block 224-1, the device state may comprise, such as, at least one of: movement speed, movement acceleration, movement direction, power on, power off, etc. For example, assuming that the electronic device 210 is a smartphone, if the user is running at a certain time point while the smartphone is in the user's pocket, the device state may comprise a movement speed of "2.2 m/s" of the smartphone which corresponds to the running speed of the user. For example, assuming that the electronic device 210 is a TV set, if the TV set is not used for a certain time period, the device state may comprise "power off". It should be appreciated that the embodiments of the present disclosure are not limited to the above exemplary device states, and should cover any other types of device state.

The historical personal information 226 comprises a list of personal information records in time series. Each personal information record comprises information about the user at a certain time point or during a certain time period. As shown in block 226-1, the personal information may comprise, such as, the user's schedule at a time point or during a time period. The user schedule may comprise at least one event and at least one corresponding time period. For example, if a jogging event is recorded in the user schedule for 7:10 am-7:30 am every day, a user information record <jogging, 7:10 am-7:30 am everyday> may be included in the personal information. It should be appreciated that the embodiments of the present disclosure are not limited to the above exemplary personal information, and should cover any other types of personal information, e.g., the user's physical condition, etc.

As shown in FIG. 2, a feature set 230 may be defined based on the historical usage log 220. For example, the feature set 230 may be defined based on at least one of the historical usage information 222, the historical device state 224 and the historical personal information 226. The feature set 230 comprises a set of features that have time attributes and are adopted by a personal usage model. Since the personal usage model intends to represent the user's personal usage habits, the features in the feature set 230 may also be defined for the purpose of representing the user's personal usage habits. Several exemplary types of features are shown in block 230-1.

Feature 1 in block 230-1 intends to represent the user's usage habit in terms of performing a specific interactive action at a certain time point. For example, assuming that the electronic device 210 is a smartphone, the user may press a physical button on the smartphone at 7:00 am every day to power on the smartphone, click an icon of the application "Wechat" on the touch screen at 7:01 am every day to run the application "Wechat", etc. Feature 1 may be used for representing the above user's usage habit. Feature 1 may comprise information about <time point 1> and <interactive action 1> that indicate the interaction action 1 occurs at the time point 1. Feature 1 may further operationally comprise information about at least one of <action attribute 1>, <target object 1>, <interaction result 1>, <device state 1>, <personal information 1>, etc., wherein <action attribute 1>, <target object 1> and <interaction result 1> are usage information associated with the interactive action 1, and <device state 1> and <personal information 1> are device state and personal information obtained at the time point 1 respectively.

Feature 2 in block 230-1 intends to represent the user's usage habit in terms of how many times to perform a specific interactive action during a certain time period. For example, assuming that the electronic device 210 is a smartphone, the user may usually perform about 20 times of touch screen clicks during 7:05 am to 7:10 am so as to check "Moments" in the application "Wechat". Feature 2 may comprise information about <time period 2>, <interactive action 2> and <number of interactive action 2> which indicate that the interaction action 2 occurs for the number of times during the time period 2. Feature 2 may further operationally comprise information about at least one of <action attribute 2>, <target object 2>, <interaction result 2>, <device state 2>, <personal information 2>, etc., wherein <action attribute 2>, <target object 2> and <interaction result 2> are usage information associated with the interactive action 2, and <device state 2> and <personal information 2> are device state and personal information obtained during the time period 2 respectively.

Feature 3 in block 230-1 intends to represent the user's usage habit in terms of how long no interactive action will be made during a certain time period. For example, assuming that the electronic device 210 is a smartphone, the user may usually power off the smartphone from 11 pm to 7 am so as to have a sleep at night, and thus there is no interactive action during this time period every day. Feature 3 may comprise information about <time period 3> and <no interactive action> which indicate that no interaction action occurs during the time period 3. Feature 3 may further operationally comprise information about at least one of <device state 3>, <personal information 3>, etc., wherein <device state 3> and <personal information 3> are device state and personal information obtained during the time period 3 respectively.

It should be appreciated that the above Feature 1 to Feature 3 are merely exemplary, and the feature set 230 may comprise any other types of features. For example, the user's usage habits may be concluded in terms of a day, a week, a month, etc., and accordingly features in the feature set 230 may also be defined in terms of a day, a week, a month, etc. Moreover, for example, although the above Feature 1 to Feature 3 consider whether there is an interactive action occurred at a certain time point or occurred for a certain times during a certain time period, any other features may be defined in consideration of, such as, whether a certain target object is operated at a certain time point or operated for a certain times during a certain time period, whether a certain interaction result is obtained at a certain time point or obtained for a certain times during a certain time period, whether a certain device state happens at a certain time point or continues during a certain time period, or any combination thereof.

The feature set 230 may be adopted by a personal usage model 240. The personal usage model 240 may be trained by training data that is based at least on the historical usage log 220 of the user. Through utilizing the historical usage log 220 to train the personal usage model 240 which adopts the feature set 230, the trained personal usage model 240 may represent the user's usage habits on the electronic device 210.

In an alternative implementation, the process 200 in FIG. 2 may also be performed for updating an existing personal usage model. For example, the personal usage model 240 may have already been initially trained by other users' historical usage logs of the electronic device 210 instead of the user's own historical usage log, resulting in that the personal usage model 240 could not represent the user's usage habits on the electronic device 210 well. The process 200 may retrain the personal usage model 240 based on the historical usage log 220 of the user to make it better represent the user's usage habits on the electronic device 210. In this case, training data from other users' historical usage logs may be deemed as negative instances.

When applying the trained or retrained personal usage model 240, the personal usage model 240 may be used for determining whether the current usage of the electronic device 210 complies with the user's usage habits, and accordingly identifying whether an abnormal usage occurs. For example, at least one of current usage information associated with the current usage behavior, current device state and current personal information may be input into the personal usage model 240, and an indication about whether an abnormal usage of the device occurs may be output by the personal usage model 240.

In a further implementation, the personal usage model 240 may identify different abnormal degrees and thus classify an abnormal usage into a corresponding abnormal degree. For example, if several consecutive failed interaction results are caused by a series of fingerprint inputs during a time period, the personal usage model 240 may identify an abnormal usage in a relative high degree since it is very likely that the electronic device 210 is currently used by others than the user. For example, if strengths of several recent virtual button clicks fluctuate in a non-significant range, the personal usage model 240 may identify an abnormal usage in a relative low degree since even click strength of the same user may vary in a reasonable range depending on different usage circumstances. In order to enable the personal usage model 240 to identify different abnormal degrees, training data for the personal usage model 240 may be labeled by a respective abnormal degree.

Moreover, in an alternative implementation, the process 200 in FIG. 2 may also involve user settings 250 in the training of the personal usage model 240. Through the user settings 250, the user may set personal preferences for the personal usage model 240. In one case, the user may decide whether a certain feature should be included in the feature set 230 or whether certain information should be included in a feature. For example, if the user wants to avoid his privacy information being collected, the user may exclude privacy information from the feature set 230, such as, personal information, certain target object (e.g., application, function, etc. to which an interactive action is applied), etc. In another case, the user may assign desired weights to certain features in the feature set 230. For example, if the user intends to identify an abnormal usage as much as possible when there is no interactive action, those features involving usage behavior of "no interactive action" may be assigned relative higher weights in the feature set 230. In another case, the user may assign different abnormal degrees for different abnormal usages, and thus the personal usage model 240 may output an abnormal degree for a certain type of abnormal usage as the user desires.

Figure 3:
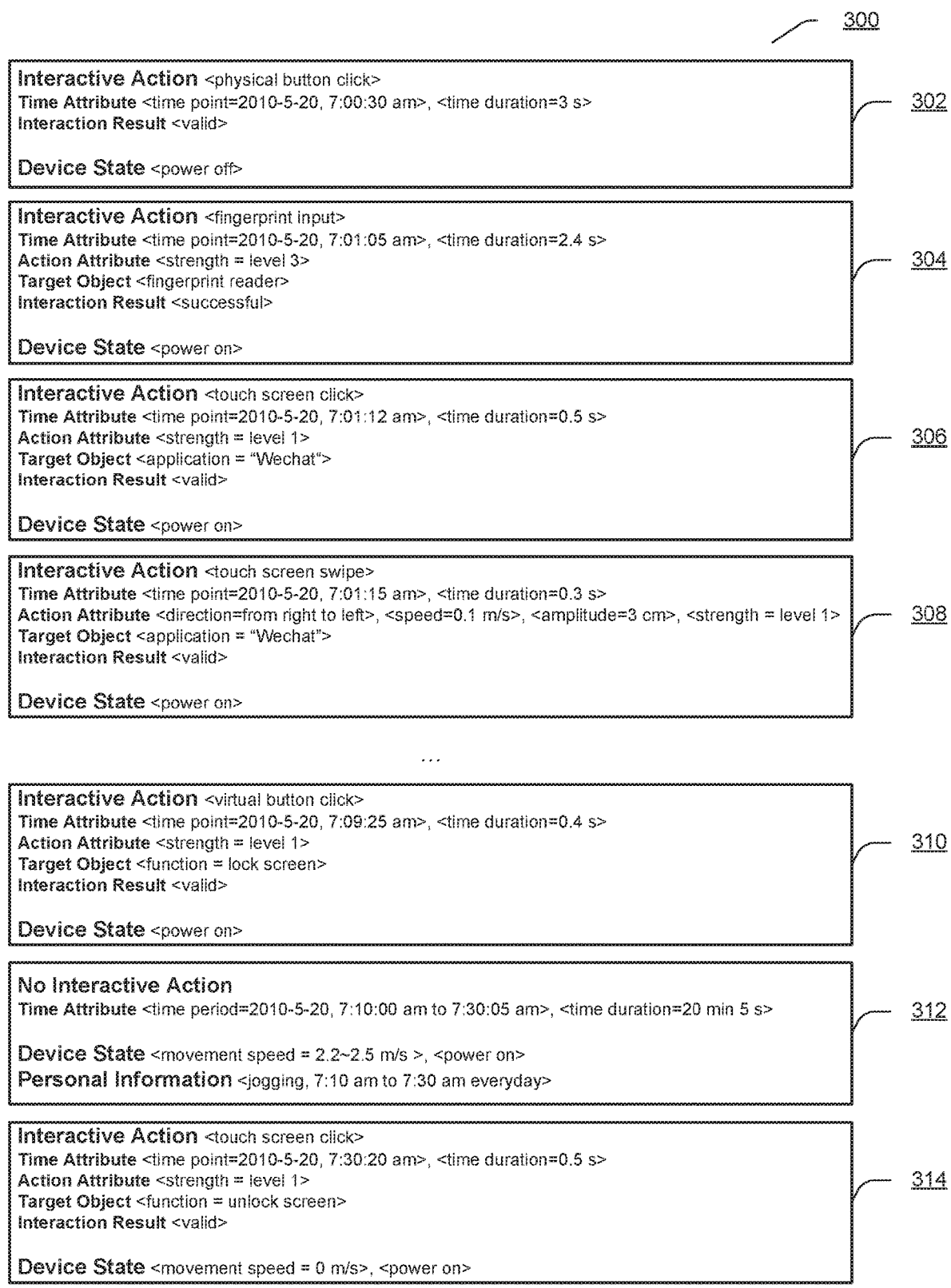
FIG. 3 illustrates an exemplary historical usage log according to an embodiment.

FIG. 3 illustrates an exemplary historical usage log 300 according to an embodiment. The historical usage log 300 is a specific example of the historical usage log 220 in FIG. 2, and the electronic device 210 is assumed as a smartphone. In the historical usage log 300, usage information, device state and/or personal information are combined together according to associated time attributes, and shown by blocks for the convenience of discussion.

In block 302, an interactive action of "physical button click" was detected at the time point of "May 20, 2010, 7:00:30 am" with time duration of "3 s". The interaction result was valid. At this time point, the device state was "power off". The record in block 302 may indicate that the user just waked up and pressed a physical button to power on the smartphone.

In block 304, an interactive action of "fingerprint input" was detected at the time point of "May 20, 2010, 7:01:05 am" with time duration of "2.4 s". The strength of the interactive action was "level 3", the target object was "fingerprint reader" and the interaction result was "successful". At this time point, the device state was "power on". The record in block 304 may indicate that the user was trying to enter an operating system of the smartphone through verifying his fingerprint.

In block 306, an interactive action of "touch screen click" was detected at the time point of "May 20, 2010, 7:01:12 am" with time duration of "0.5 s". The strength of the interactive action was "level 1", the target object was the application "Wechat", and the interaction result was valid. At this time point, the device state was "power on". The record in block 306 may indicate that the user was trying to run the application "Wechat" installed on the smartphone.

In block 308, an interactive action of "touch screen swipe" was detected at the time point of "May 20, 2010, 7:01:15 am" with time duration of "0.3 s". The direction of the interactive action was "from right to left", the speed of the interactive action was "0.1 m/s", the amplitude of the interactive action was "3 cm", and the strength of the interactive action was "level 1". The target object was the application "Wechat" and the interaction result was valid. At this time point, the device state was "power on". The record in block 308 may indicate that the user was browsing contents in the application "Wechat".

Following a series of interactive actions that are omitted from FIG. 3, in block 310, an interactive action of "virtual button click" was detected at the time point of "May 20, 2010, 7:09:25 am" with time duration of "0.4 s". The strength of the interactive action was "level 1", the target object was the function "lock screen", and the interaction result was valid. At this time point, the device state was "power on". The record in block 310 may indicate that the user stopped using the smartphone and was locking the screen of the smartphone.

In block 312, no interactive action was identified during the time period from "7:10:00 am" to "7:30:05 am" on May 20, 2010, and the time duration was "20 min 5 s". During this time period, the electronic device was "power on" and the movement speed of the electronic device was "2.2~2.5 m/s". Moreover, personal information, e.g., the user's schedule, during this time period was obtained, in which a jogging event was set for "7:10 am to 7:30 am everyday". The record in block 312 may indicate that the user was jogging during this time period as shown in his schedule, and accordingly the user had not used the smartphone during this time period.

In block 314, an interactive action of "touch screen click" was detected at the time point of "May 20, 2010, 7:30:20 am" with time duration of "0.5 s". The strength of the interactive action was "level 1", the target object was the function "unlock screen" and the interaction result was valid. At this time point, the electronic device was "power on" and the movement speed of the electronic device was "0 m/s". The record in block 314 may indicate that the user stopped jogging and started to use the smartphone again through unlocking the screen of the smartphone.

It should be appreciated that FIG. 3 merely shows an exemplary segment of the historical usage log 300, and according to actual historical usage by the user, the historical usage log 300 may include more or less information than that shown in FIG. 3.

FIG. 4 illustrates an exemplary feature set 400 of a personal usage model according to an embodiment. The feature set 400 is a specific example of the feature set 230 in FIG. 2, and the electronic device 210 is assumed as a smartphone. The feature set 400 may be defined based at least on the historical usage log 300 in FIG. 3. Features in the feature set 400 are shown by blocks for the convenience of discussion.

In block 402, a feature is defined as comprising: <time point=7:00 am>, <physical button click>, <time duration=3 s>, <valid>, <power off>. The feature in block 402 may indicate that the user has a usage habit to power on the smartphone at 7 am every day. This feature may be derived from a group of records similar with the record in block 302.

In block 404, a feature is defined as comprising: <time point=7:01 am>, <touch screen click>, <time duration=0.5 s>, <strength=level 1>, <application="Wechat">, <valid>, <power on>. The feature in block 404 may indicate that the user has a usage habit to run the application "Wechat" at 7:01 am every day, i.e., immediately after powering on the smartphone. This feature may be derived from a group of records similar with the record in block 306.

In block 406, a feature is defined as comprising: <time period=7:01 am to 7:10 am>, <touch screen click>, <number of touch screen click=26>, <time duration=0.5 s>, <strength=level 1>, <power on>. The feature in block 406 may indicate that the user has a usage habit to click the touch screen for almost 26 times during this time period every day. This feature may be derived from a plurality of records in the historical usage log 300 that include an interactive action of "touch screen click" occurred within the time period.

In block 408, a feature is defined as comprising: <time period=7:01 am to 7:05 am>, <touch screen swipe>, <number of touch screen swipe=12>, <time duration=0.3 s>, <strength=level 1>, <application="Wechat">, <power on>. The feature in block 408 may indicate that the user has a usage habit to browse contents in the application "Wechat" and perform touch screen swipes for almost 12 times during this time period every day. This feature may be derived from a plurality of records similar with the record in block 308.

In block 410, a feature is defined as comprising: <time period=7:10 am to 7:30 am>, <no interactive action>, <time duration=20 min 5 s>, <movement speed=2.2~2.5 m/s>, <jogging, 7:10 am to 7:30 am everyday>, <power on>. The feature in block 410 may indicate that the user has a usage habit to jog from 7:10 am to 7:30 am every day and thus causing the smartphone to move at a speed of 2.2~2.5 m/s during this time period. This feature may be derived from a plurality of records similar with the record in block 312.

It should be appreciated that FIG. 4 merely shows some exemplary features in the feature set 400, and these features may be modified in any way. Moreover, according to the historical usage log 300, the feature set 400 may include more or less features than those shown in FIG. 4.

Figure 5:
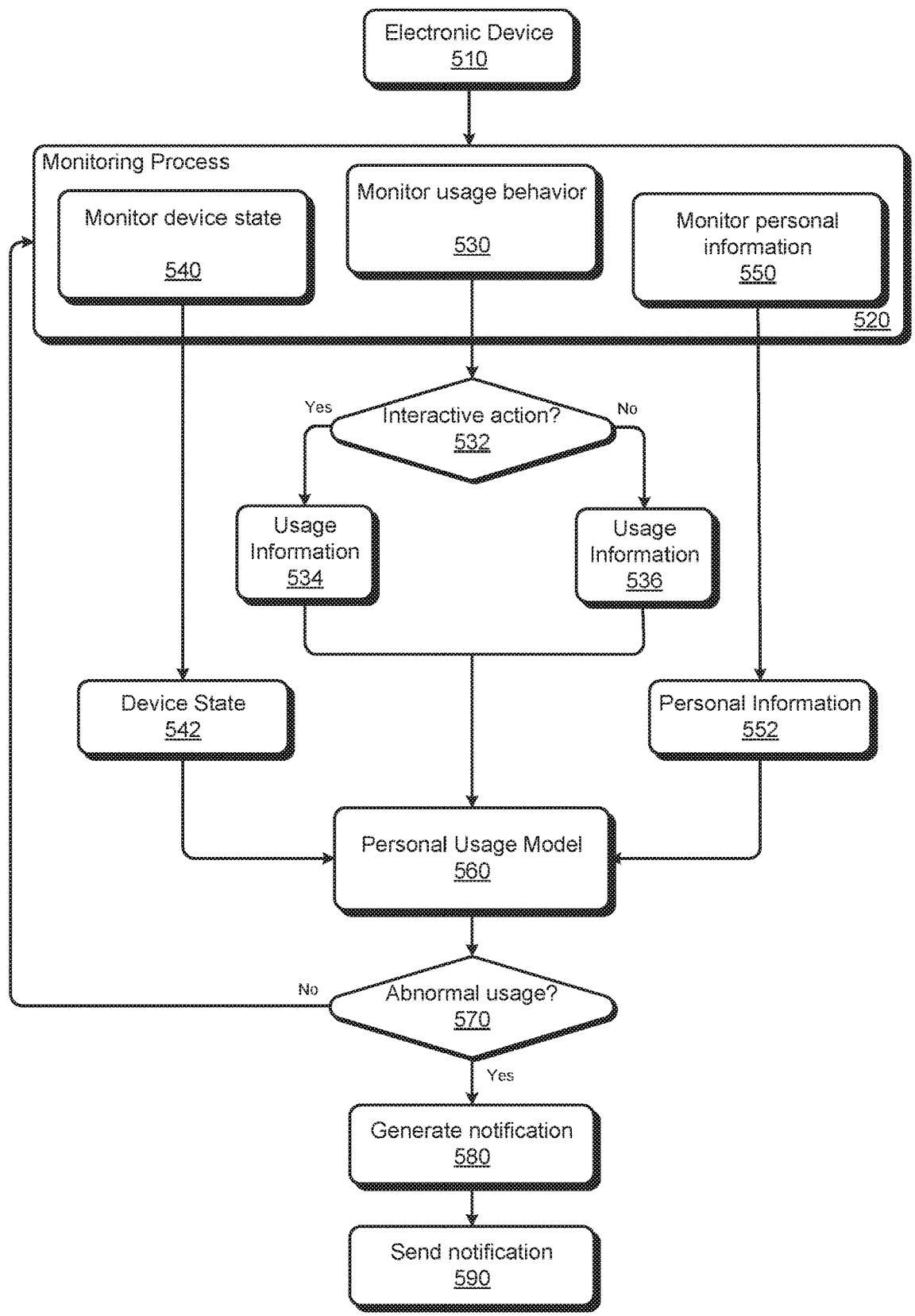
FIG. 5 illustrates an exemplary process for identifying an abnormal usage of an electronic device according to an embodiment.

FIG. 5 illustrates an exemplary process 500 for identifying an abnormal usage of an electronic device 510 according to an embodiment.

At 520, a monitoring process may be performed on the electronic device 510 for obtaining the current usage states of the electronic device 510.

In an implementation, the monitoring process at 520 may comprise monitoring a usage behavior of the electronic device at 530, such as, detecting an interactive action occurred to the electronic device. At 532, it is determined whether an interactive action has been detected. If it is determined that an interactive action occurs at the current time point or during a recent time period, usage information associated with this usage behavior, i.e., usage information associated with the interactive action, may be obtained at 534. The usage information associated with the interactive action may be further provided to a personal usage model 560 which is established for the user of the electronic device through, e.g., the process 200 in FIG. 2. If it is determined that no interactive action occurs during a recent time period, usage information associated with this usage behavior may be obtained at 536. The usage information associated with this usage behavior may be further provided to the personal usage model 560.

In an alternative implementation, the monitoring process at 520 may further comprise monitoring a device state of the electronic device 510 at 540 while performing the monitoring of the usage behavior at 530. For example, a device state may be monitored at the time point of monitoring the usage behavior or during the time period for monitoring the usage behavior. Through the monitoring at 540, a device state 542 may be obtained. The device state 542 may be further provided to the personal usage model 560.

In an alternative implementation, the monitoring process at 520 may further comprise monitoring personal information of the user at 550 while performing the monitoring of the usage behavior at 530. Through the monitoring at 550, personal information 552 may be obtained, which is associated with the time point or the time period of monitoring the usage behavior. The personal information 552 may be further provided to the personal usage model 560.

It should be appreciated that the monitoring process at 520 may comprise at least one of monitoring usage behavior at 530, monitoring device state at 540 and monitoring personal information at 550. Accordingly, the personal usage model 560 may utilize at least one of the usage information 534 or 536, the device state 542 and the personal information 552 to determine whether an abnormal usage of the electronic device occurs.

At 570, if it is determined that no abnormal usage occurs, the process 200 returns to continue the monitoring process at 520.

If it is determined at 570 that an abnormal usage occurs, a notification may be generated at 580. The notification may indicate the abnormal usage. Alternatively, the notification may further indicate an abnormal degree of the abnormal usage. In a further implementation, the notification may be generated based on an abnormal degree of the abnormal usage. For example, if the abnormal degree exceeds or is below a predetermined threshold, the notification may be generated, otherwise, no notification would be generated.

At 590, the notification may be sent to a third party.

It should be appreciated that all the steps and operations in the process 500 are exemplary, and according to actual application requirements, various modifications may be made to the process 500. For example, although it is shown in FIG. 5 that usage information of the currently-monitored usage behavior is used for identifying an abnormal usage, usage information of one or more previous usage behaviors may also be used for identifying an abnormal usage together with the usage information of the currently-monitored usage behavior. Thus, the personal usage model 560 may determine an abnormal usage in consideration of a plurality of usage behaviors.

Figure 6:
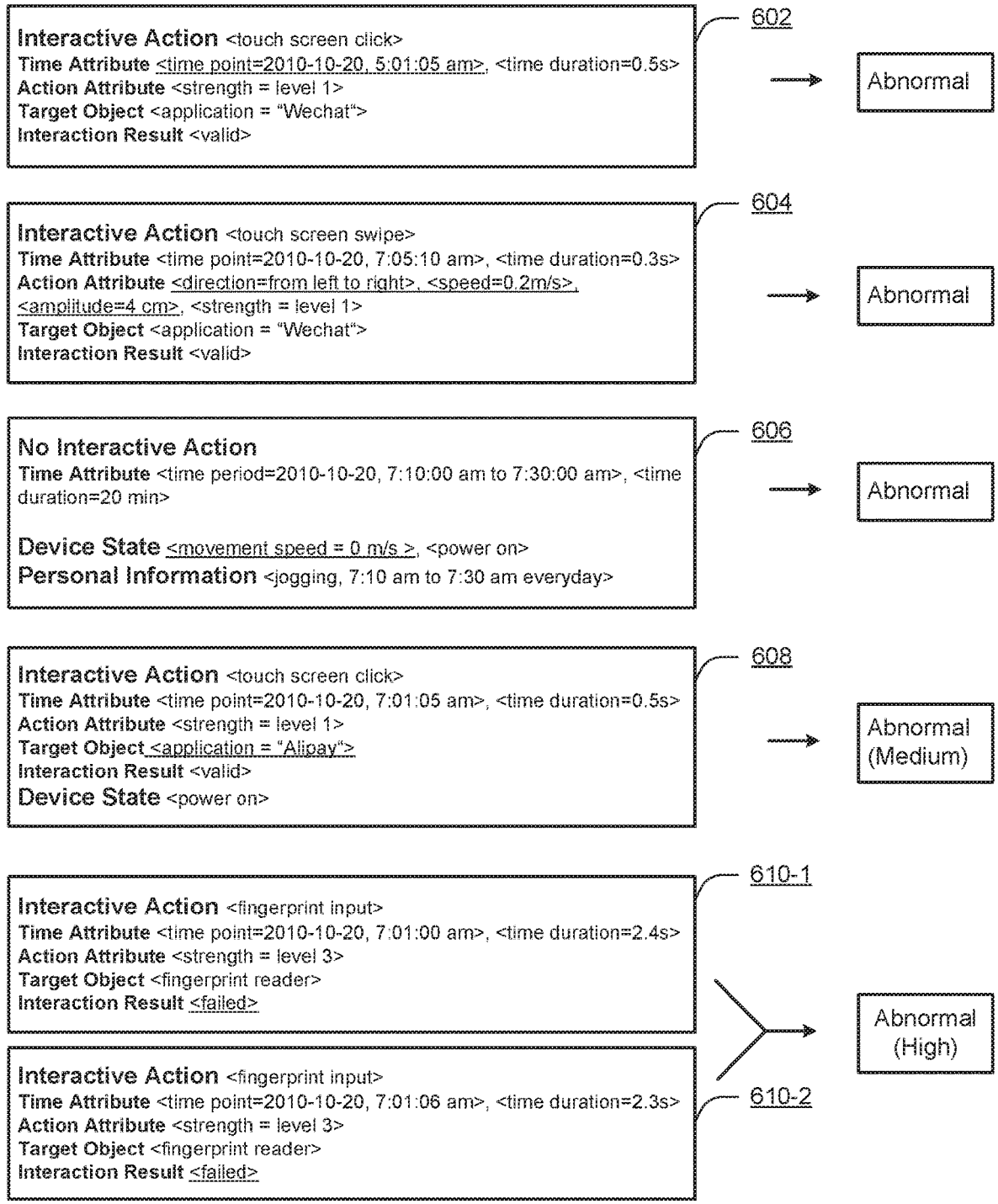
FIG. 6 illustrates exemplary monitored information and exemplary abnormal identification results according to an embodiment.

FIG. 6 illustrates exemplary monitored information and exemplary abnormal identification results according to an embodiment. The monitored information shown by blocks in FIG. 6 may be obtained through the monitoring process 520 in FIG. 5, and the abnormal identification results in FIG. 6 may be output by the personal usage model 560 in FIG. 5.

In block 602, an interactive action of "touch screen click" is monitored which intends to run the application "Wechat". The time point of the interactive action is "May 20, 2010, 5:01:05 am". It is assumed the personal usage model has derived that the user has a usage habit to run the application "Wechat" at 7:01 am every day. Since the above interactive action occurs at 5:01:05 am which is too earlier than "7:01 am", an abnormal usage may be determined by the personal usage model.

In block 604, an interactive action of "touch screen swipe" is monitored. Action attributes of the interactive action at least comprise: the direction of the interactive action is "from left to right", the speed of the interactive action is "0.2 m/s", and the amplitude of the interactive action is "4 cm". It is assumed the personal usage model has derived that when performing a "touch screen swipe", the user has some usage habits, e.g., swiping in a direction of "from right to left" at a speed of "0.1 m/s" with amplitude of "3 cm". Since the above monitored interactive action is different from the user's usage habits in terms of direction, speed and amplitude, an abnormal usage may be determined by the personal usage model. In this case, for example, it is possible that the user is using the electronic device in an abnormal state, or the electronic device is used by others who have different usage habits from the user.

In block 606, no interactive action has been identified during a time period from 7:10:00 am to 7:30:00 am on Oct. 20, 2010, and the personal information shows that the user will jog during this time period every day, however, a movement speed of the electronic device remains 0 m/s during this time period. It is assumed the personal usage model has derived that the user has a usage habit of not using the electronic device but keeping a movement speed of the electronic device at about 2.2~2.5 m/s during this time period every day, because the user will jog in this time period. Since the above detected movement speed of "0 m/s" indicates that the electronic device is not moving and accordingly the user may be not jogging during this time period, which deviates from the user's usage habit, an abnormal usage may be determined by the personal usage model. In this case, for example, it is possible that the user is in a bad physical condition or meets an incident, causing that the user could not jog as usual during this time period.

In block 608, an interactive action of "touch screen click" is monitored at the time point of "Oct. 20, 2010, 7:01:05 am" which intends to run the application "Alipay", wherein "Alipay" is an instrument of payment. It is assumed the personal usage model has derived that the user has a usage habit to run the application "Wechat", instead of "Alipay", at this time point every day. Since the above interactive action intends to run the application "Alipay" at 7:01:05 am in the morning, which is rarely used by the user at this time point, an abnormal usage may be determined by the personal usage model. As an example, the personal usage model may determine an abnormal degree of the abnormal usage. Considering that the user may have intended to run the application "Wechat" but click the icon of "Alipay" by mistake, the abnormal degree of this abnormal usage may be medium.

In block 610-1, an interactive action of "fingerprint input" is monitored at the time point of "Oct. 20, 2010, 7:01:00 am", but the interaction result is "failed". In block 610-2, a further interactive action of "fingerprint input" is monitored at the time point of "Oct. 20, 2010, 7:01:06 am", and the interaction result is "failed" too. The monitored information in block 610-1 and block 610-2 indicates that fingerprint verification has been tried for twice consecutively and neither of the trials passes verification. It is assumed the personal usage model has derived that the user usually passes fingerprint verification at one trial. Moreover, considering that fingerprint verification is rarely failed for twice consecutively if it is the user himself who performs fingerprint input, the personal usage model may determine an abnormal usage of the electronic device based on both the monitored information in block 610-1 and block 610-2. If the personal usage model is capable of determining an abnormal degree of an abnormal usage, a high abnormal degree may be determined in this case since it is very likely that the electronic device is used by others than the user.

Figure 7:
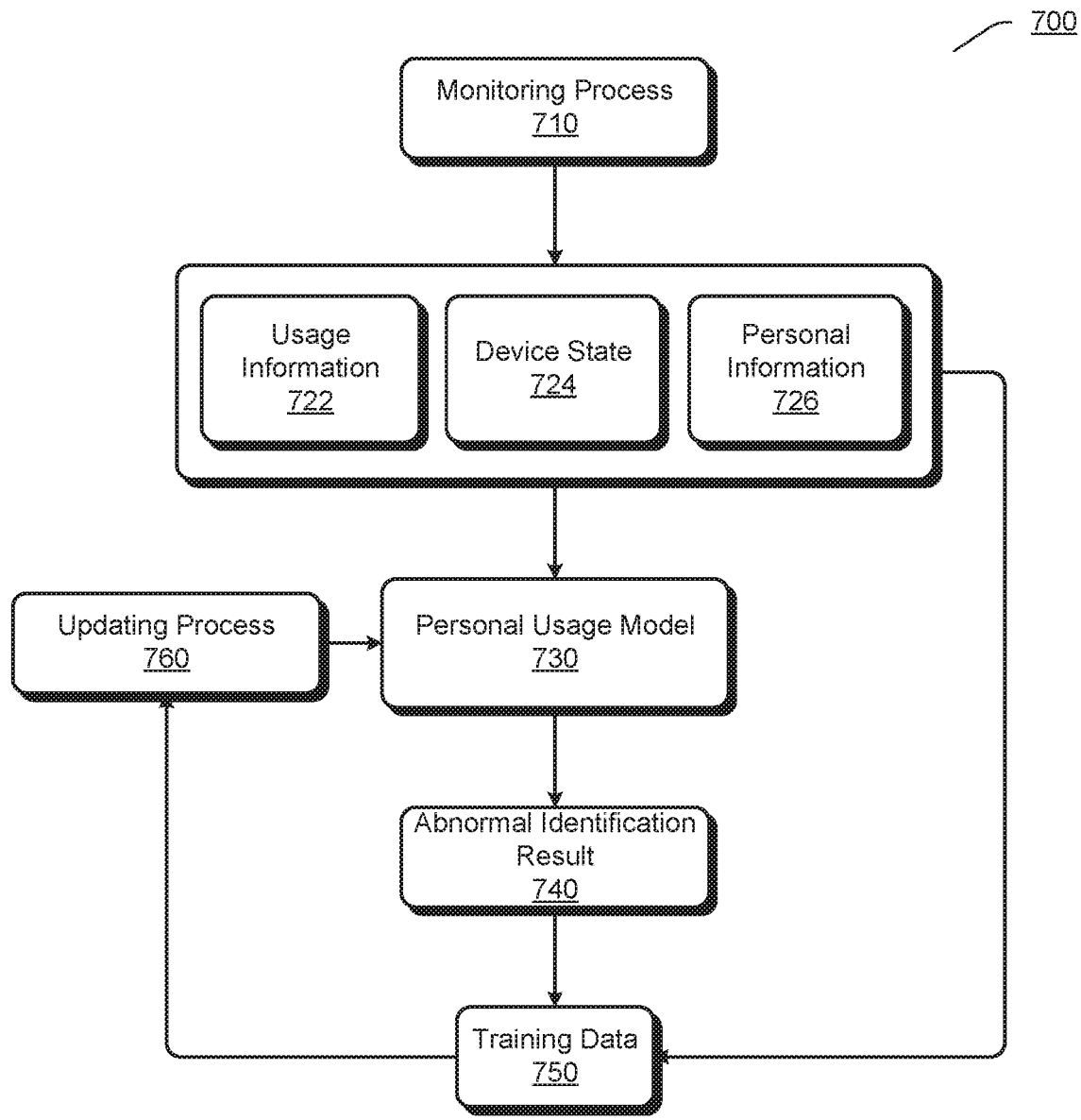
FIG. 7 illustrates an exemplary process for dynamically updating a personal usage model according to an embodiment.

FIG. 7 illustrates an exemplary process 700 for dynamically updating a personal usage model according to an embodiment. According to the embodiment, the personal usage model may be updated while the personal usage model is being applied for identifying an abnormal usage of an electronic device according to the process 500 in FIG. 5. As discussed above, through the process 500, the current usage states of the electronic device, e.g., usage information, and optionally device state and user information, may be obtained, and an abnormal usage of the electronic device may be determined. In the process 700, the current usage states, e.g., the usage information, and the abnormal usage that are obtained through the process 500 may be further used for updating the personal usage model.

New training data may be continuously obtained based on the current usage states of the electronic device and a corresponding abnormal identification result, and the personal usage model may be continuously updated or retrained with the new training data accordingly. In this way, as more and more new training data is obtained, the personal usage model may represent the user's personal usage habits more precisely.

A monitoring process 710 may be performed, which corresponds to the monitoring process at 520 in FIG. 5. The monitoring process 710 may comprise monitoring at least one of a usage behavior of the electronic device, a device state of the electronic device, and personal information of the user.

Through the monitoring process 710, the current usage states of the electronic device may be obtained. For example, usage information 722 associated with the usage behavior may be obtained, wherein the usage information 722 may correspond to the usage information 534 or 536 in FIG. 5. Optionally, a device state 724 and/or personal information 726 may be also obtained, which may correspond to the device state 542 and the personal information 552 in FIG. 5 respectively.

The current usage states of the electronic device, e.g., the usage information 722, and optionally, the device state 724 and the personal information 726, may be provided to a personal usage model 730. The personal usage model 730 may be used for identifying an abnormal usage of the electronic device in the same way as the personal usage model 560 in FIG. 5.

An abnormal identification result 740 may be output from the personal usage model 730. The abnormal identification result 740 may indicate whether an abnormal usage or a normal usage is identified for the current usage states.

Training data 750 may be formed based on the current usage states and the abnormal identification result. For example, assuming that the current usage states comprise the usage information 722 and the abnormal identification result indicates an abnormal usage, training data 750 may be formed based on a data pair of [usage information 722, abnormal usage]. For example, assuming that the current usage states comprise the usage information 722 and the device state 724, and the abnormal identification result indicates a normal usage, training data 750 may be formed based on a data pair of [(usage information 722, device state 724), normal usage].

An updating process 760 may be performed for updating the personal usage model 730 with the training data 750. For example, the personal usage model 730 may be retrained based on the training data 750.

The process 700 may be performed iteratively. The monitoring process 710 may continue to be performed, and new training data 750 may be formed continuously. Accordingly the personal usage model 730 may be updated with the new training data dynamically.

It should be appreciated that although the above discussions in connection with FIG. 3 to FIG. 7 focus on a smartphone, the inventive concept of the embodiments of the present disclosure may also be applied in a similar way for any other types of electronic device, e.g., smart watch, household appliances, etc. Features adopted by the personal usage model and monitored information through a monitoring process on the electronic device may be varied depending on various types of electronic device, however, all these variants shall fall into the scope of the present disclosure.

Figure 8:
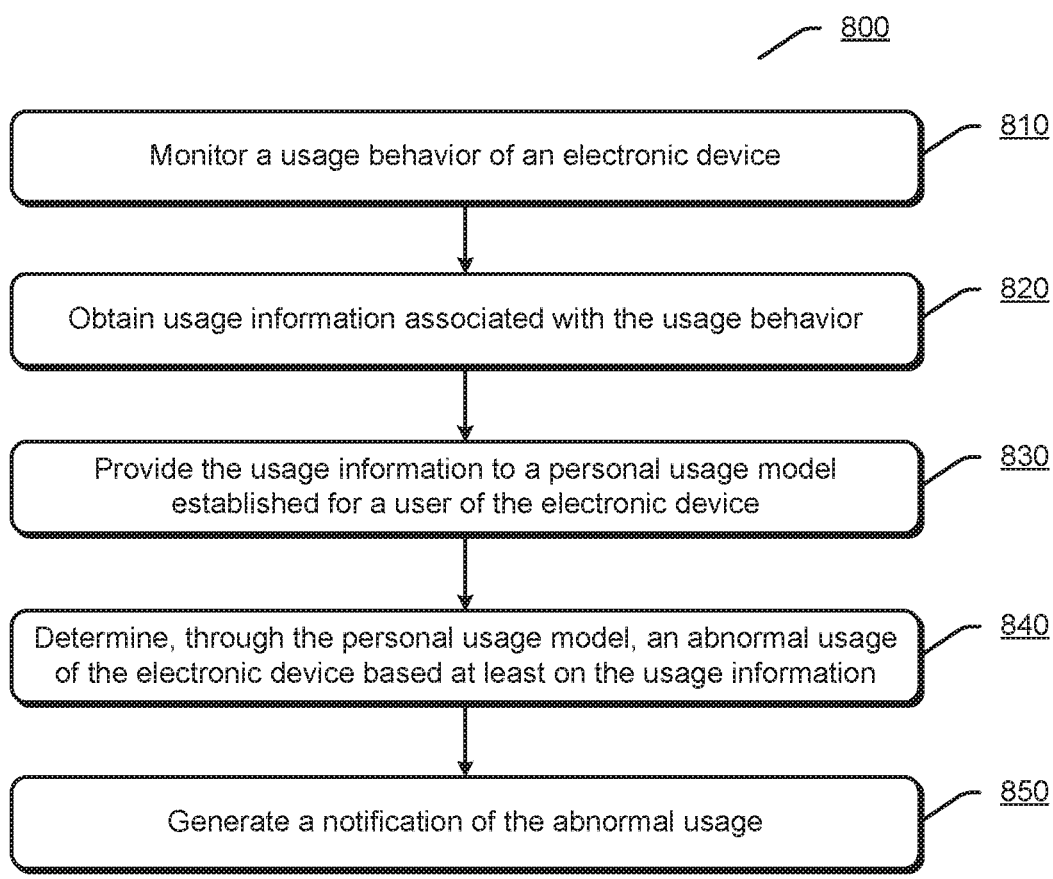
FIG. 8 illustrates a flowchart of an exemplary method for identifying an abnormal usage of an electronic device according to an embodiment.

FIG. 8 illustrates a flowchart of an exemplary method 800 for identifying an abnormal usage of an electronic device according to an embodiment.

At 810, a usage behavior of the electronic device may be monitored.

At 820, usage information associated with the usage behavior may be obtained.

At 830, the usage information may be provided to a personal usage model established for a user of the electronic device.

At 840, an abnormal usage of the electronic device may be determined based at least on the usage information through the personal usage model.

At 850, a notification of the abnormal usage may be generated.

In an implementation, the monitoring the usage behavior may comprise: detecting an interactive action occurred to the electronic device at a time point or during a time period. The usage information may comprise at least one of action attribute, time attribute, target object and interaction result of the interactive action. The interactive action may comprise at least one of: virtual button click, physical button click, touch screen swipe, touch screen click, voice input, fingerprint input and mechanical operation. The action attribute may comprise at least one of: direction, speed, amplitude and strength. The time attribute may comprise at least one of: time point, time period and time duration. The target object may comprise at least one of: application, file, function, password input box, fingerprint reader and mechanical switch. The interaction result may comprise at least one of: successful, failed, valid and invalid.

In an implementation, the monitoring the usage behavior may comprise: identifying no interactive action occurred to the electronic device during a time period. The usage information may comprise time attribute, the time attribute comprising at least one of time period and time duration.

In an implementation, the method 800 may further comprise: monitoring a device state of the electronic device while monitoring the usage behavior; and providing the device state to the personal usage model. The determining the abnormal usage may be further based on the device state. The device state may comprise at least one of: movement speed, movement acceleration, movement direction, power on and power off.

In an implementation, the method 800 may further comprise: monitoring personal information of the user while monitoring the usage behavior; and providing the personal information to the personal usage model. The determining the abnormal usage may be further based on the personal information. The personal information may at least comprise the user's schedule associated with a time point or a time period for monitoring the usage behavior.

In an implementation, the personal usage model may adopt features that are based on at least one of usage information, device state and personal information. The personal usage model may be trained based at least on a historical usage log of the user on the electronic device, the historical usage log comprising at least one of historical usage information, historical device state and historical personal information. The personal usage model may be updated based at least on the usage information and the abnormal usage.

In an implementation, the method 800 may further comprise: providing usage information associated with one or more previous usage behaviors to the personal usage model. The determining the abnormal usage may be further based on the usage information associated with the one or more previous usage behaviors.

In an implementation, the method 800 may further comprise: determining, based on the abnormal usage, that the user is in an abnormal state or the electronic device is used by others than the user.

In an implementation, the method 800 may further comprise: sending the notification to a third party. The notification may be sent by the electronic device, a cloud control unit in a cloud system to which the electronic device connects, or a control device in an intelligent housing system to which the electronic device belongs.

In an implementation, the electronic device may be an independent intelligent electronic device, or a terminal device in a cloud system, or one or more household appliances in an intelligent housing system.

It should be appreciated that the method 800 may further comprise any steps/processes for identifying an abnormal usage of an electronic device according to the embodiments of the present disclosure as mentioned above.

Figure 9:
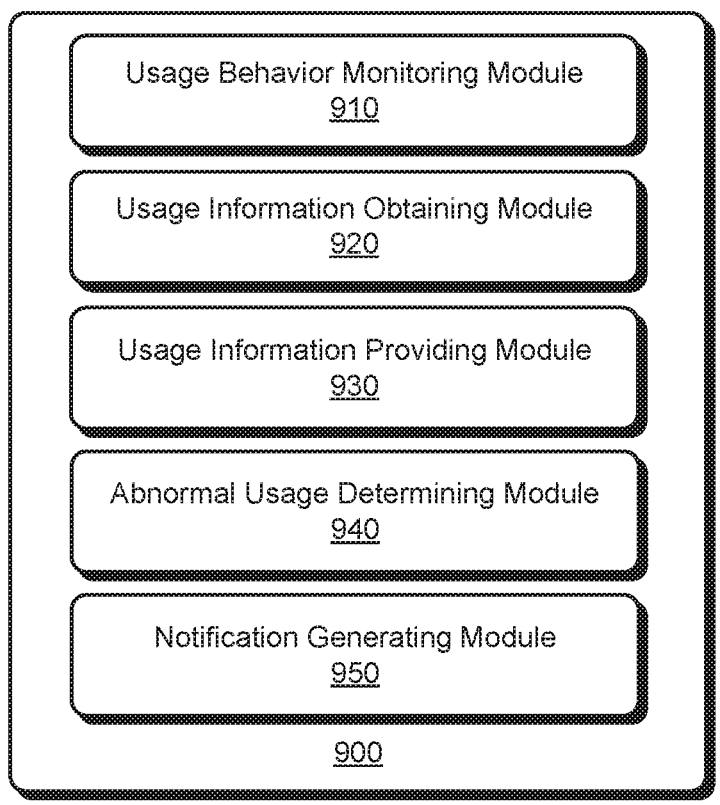
FIG. 9 illustrates an exemplary apparatus for identifying an abnormal usage of an electronic device according to an embodiment.

FIG. 9 illustrates an exemplary apparatus 900 for identifying an abnormal usage of an electronic device according to an embodiment.

The apparatus 900 may comprise: a usage behavior monitoring module 910, for monitoring a usage behavior of the electronic device; a usage information obtaining module 920, for obtaining usage information associated with the usage behavior; a usage information providing module 930, for providing the usage information to a personal usage model established for a user of the electronic device; an abnormal usage determining module 940, for determining, through the personal usage model, an abnormal usage of the electronic device based at least on the usage information; and a notification generating module 950, for generating a notification of the abnormal usage.

In an implementation, the usage behavior monitoring module 910 may be further for detecting an interactive action occurred to the electronic device at a time point or during a time period. The usage information may comprise at least one of action attribute, time attribute, target object and interaction result of the interactive action.

In an implementation, the usage behavior monitoring module 910 is further for identifying no interactive action occurred to the electronic device during a time period. The usage information may comprise time attribute, the time attribute comprising at least one of time period and time duration.

In an implementation, the apparatus 800 may further comprise: a device state monitoring module, for monitoring a device state of the electronic device while monitoring the usage behavior; and a device state providing module, for providing the device state to the personal usage model. The abnormal usage determining module may be for determining the abnormal usage further based on the device state.

In an implementation, the apparatus 900 may further comprise: a personal information monitoring module, for monitoring personal information of the user while monitoring the usage behavior; and a personal information providing module, for providing the personal information to the personal usage model. The abnormal usage determining module may be for determining the abnormal usage further based on the personal information.

Moreover, the apparatus 900 may also comprise any other modules configured for identifying an abnormal usage of an electronic device according to the embodiments of the present disclosure as mentioned above.

Figure 10:
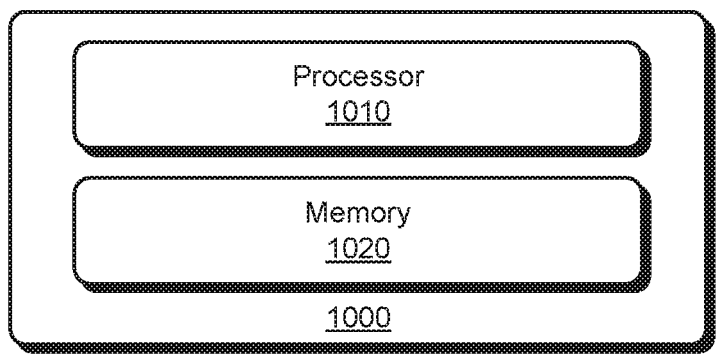
FIG. 10 illustrates an exemplary apparatus for identifying an abnormal usage of an electronic device according to an embodiment.

FIG. 10 illustrates an exemplary apparatus 1000 for identifying an abnormal usage of an electronic device according to an embodiment.

The apparatus 1000 may comprise one or more processors 1010 and a memory 1020 storing computer-executable instructions. When executing the computer-executable instructions, the one or more processors 1010 may: monitor a usage behavior of the electronic device; obtain usage information associated with the usage behavior; provide the usage information to a personal usage model established for a user of the electronic device; determine, through the personal usage model, an abnormal usage of the electronic device based at least on the usage information; and generate a notification of the abnormal usage. The one or more processors 910 may be further configured for performing any operations of the methods for identifying an abnormal usage of an electronic device according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for identifying an abnormal usage of an electronic device according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for identifying an abnormal usage of an electronic device, comprising:
   monitoring a usage behavior of the electronic device where monitoring the usage behavior includes detecting an interactive action occurred to the electronic device at a time point or during a time period;
   obtaining usage information associated with the usage behavior;
   obtaining a device state for the electronic device at the time point or during the time period;
   providing the usage information and the device state to a personal usage model established for a user of the electronic device, wherein the personal usage model includes device state features extracted from historical device states of the electronic device for a historical time period and personal usage features extracted from historical usage information for the historical time period;
   monitoring a schedule of the user while monitoring the usage behavior;
   providing the schedule to the personal usage model;
   determining, through evaluation of at least the device state using the device state features and usage information using the personal usage features of the personal usage model, an abnormal usage of the electronic device; and
   generating a notification of the abnormal usage.

2. The method of claim 1, wherein
   the monitoring the usage behavior comprises: identifying no interactive action occurred to the electronic device during a time period, and
   the usage information comprises time attribute, the time attribute comprising at least one of time period and time duration.

3. The method of claim 1, wherein
   the device state comprises at least one of: movement speed, movement acceleration, movement direction, power on and power off.

4. The method of claim 1, wherein
   the personal usage model adopts features that are based on at least one of usage information, device state and personal information, and
   the personal usage model is trained based at least on a historical usage log of the user on the electronic device, the historical usage log comprising at least one of historical usage information, historical device state and historical personal information.

5. The method of claim 4, wherein
   the personal usage model is updated based at least on the usage information and the abnormal usage.

6. The method of claim 1, further comprising:
   providing usage information associated with one or more previous usage behaviors to the personal usage model,
   wherein the determining the abnormal usage is further based on the usage information associated with the one or more previous usage behaviors.

7. The method of claim 1, further comprising:
   determining, based on the abnormal usage, that the user is in an abnormal state or the electronic device is used by others than the user.

8. The method of claim 1, further comprising:
   sending the notification to a third party, wherein the notification is sent by the electronic device, a cloud control unit in a cloud system to which the electronic device connects, or a control device in an intelligent housing system to which the electronic device belongs.

9. The method of claim 1, wherein
   the electronic device is an independent intelligent electronic device, or a terminal device in a cloud system, or one or more household appliances in an intelligent housing system.

10. An apparatus for identifying an abnormal usage of an electronic device, comprising:
    at least one processor; and
    memory including instructions that, when executed by the at least one processor, cause the at least one processor to perform operations to:
    monitor a usage behavior of the electronic device where monitoring the usage behavior includes detecting an interactive action occurred to the electronic device at a time point or during a time period;

obtain usage information associated with the usage behavior, the usage information comprising an action attribute that includes determining a direction, speed and amplitude of a touch screen swipe;

obtain a device state for the electronic device at the time point or during the time period;

provide the usage information and the device state to a personal usage model established for a user of the electronic device, wherein the personal usage model includes device state features extracted from historical device states of the electronic device for a historical time period and personal usage features extracted from historical usage information for the historical time period;

determine, through evaluation of at least the device state using the device state features and usage information using the personal usage features of the personal usage model, an abnormal usage of the electronic device; and generate a notification of the abnormal usage.

11. The apparatus of claim 10, the memory further including instructions that, when executed by the at least one processor, cause the at least one processor to perform operations to:

identify no interactive action occurred to the electronic device during a time period, wherein the usage information comprises a time attribute, the time attribute comprising at least one of time period and time duration.

12. The apparatus of claim 10, the memory further including instructions that, when executed by the at least one processor, cause the at least one processor to perform operations to:

monitor personal information of the user while monitoring the usage behavior; and provide the personal information to the personal usage model, the instructions to determine the abnormal usage further comprising instructions to determine the abnormal usage based on the personal information.

13. An apparatus for identifying an abnormal usage of an electronic device, comprising:

one or more processors; and a memory storing computer-executable instructions that, when executed, cause the one or more processors to:

monitor a usage behavior of the electronic device where monitoring the usage behavior includes detecting an interactive action occurred to the electronic device at a time point or during a time period;

obtain usage information associated with the usage behavior, the usage information comprising an interaction result of the interactive action, the interaction result including at least one of: successful, failed, valid and invalid;

obtain a device state for the electronic device at the time point or during the time period;

provide the usage information and the device state to a personal usage model established for a user of the electronic device, wherein the personal usage model includes device state features extracted from historical device states of the electronic device for a historical time period and personal usage features extracted from historical usage information for the historical time period;

determine, through evaluation of at least the device state using the device state features and usage information using the personal usage features of the personal usage model, an abnormal usage of the electronic device; and generate a notification of the abnormal usage.

\* \* \* \* \*